E. WOERNER.
SPEED CHANGING DEVICE.
APPLICATION FILED MAY 20, 1910.
1,103,335.
Patented July 14, 1914.
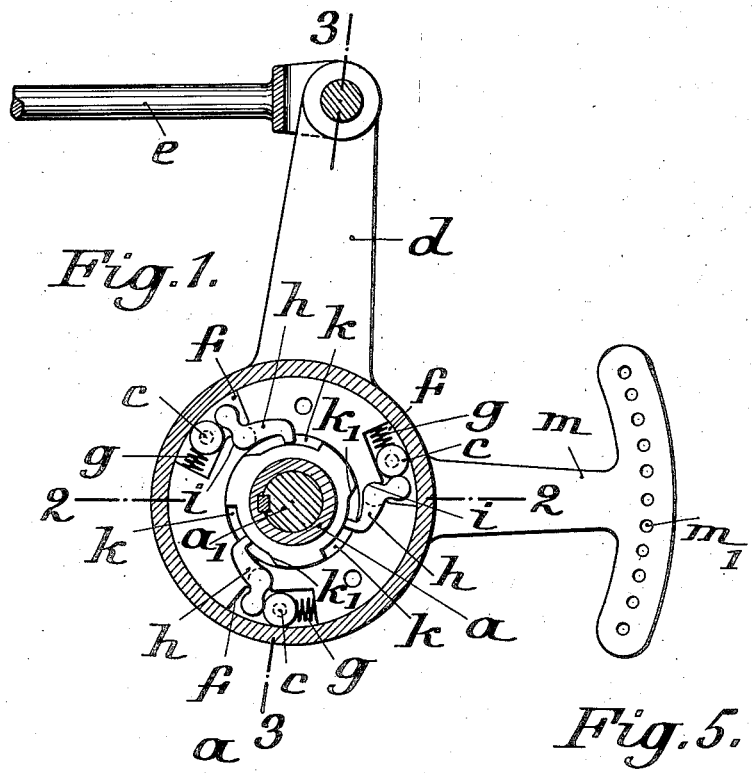
Fig. 1.
Fig. 5.
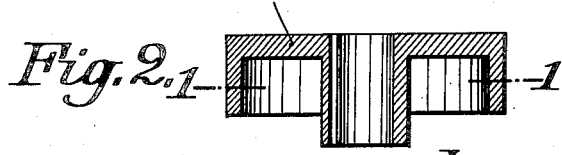
Fig. 2.
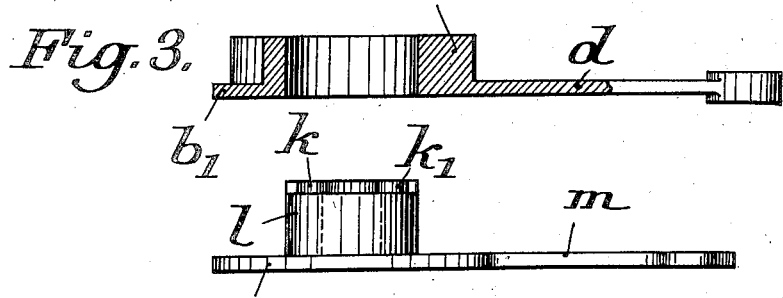
Fig. 3.
Fig. 4.
WITNESSES
INVENTOR
Eugen Woerner
by Pennie & Goldsborough
his Attorneys

UNITED STATES PATENT OFFICE.

EUGEN WOERNER, OF CANNSTATT, GERMANY, ASSIGNOR TO THE FIRM OF ROBERT BOSCH, OF STUTTGART, GERMANY.

SPEED-CHANGING DEVICE.

1,103,335.

Specification of Letters Patent. Patented July 14, 1914.

Application filed May 20, 1910. Serial No. 562,366.

*To all whom it may concern:*

Be it known that I, EUGEN WOERNER, a subject of the Emperor of Germany, residing at Cannstatt, Germany, have invented certain new and useful Improvements in Speed-Changing Devices; and I do hereby declare the following to be a full, clear, and exact description of the invention, such as will enable others skilled in the art to which it appertains to make and use the same.

The invention relates to a device for altering the speed of rotation of a driven shaft without altering the speed of rotation of the driving shaft; or, in other words, it relates to a device for transmitting motion to machine parts whose speed of rotation is to be varied independently of the speed of the driving element. For instance, this problem is involved in the driving of lubricating pumps, which must be adjusted to various speeds for like speeds of the machine which they lubricate; otherwise they would operate uneconomically because according to the character of the oil employed and the character of the machine itself, as well as other attendant conditions, either a moderate or a liberal lubrication is desired.

In accordance with the invention, the device presupposes a coupling between the driving and the driven element, which coupling carries the driven element along in but one direction or rotation, and converts a reciprocating motion of the driving element into a rotary motion of the driven element. The invention consists in providing such a coupling with a device whereby it automatically throws itself out of engagement as soon as the driven element has received a predetermined stroke whose length, during the operation, can be varied at will within wide limits without changing the length of the stroke of the driving element. Consequently, inasmuch as like intervals of time coincide with like numbers of strokes of the driving element, and to each stroke of the driving element (according to the adjustment of the disengaging device) there corresponds a different length of stroke of the driven element, it results that for like speeds of the driving element different velocities of the driven shaft can be obtained.

In the drawing, Figure 1 represents an end view of the coupling, partly in section, on a plane indicated by the line 1—1 of Fig. 2; Fig. 2 represents a section on the line 2—2 of Fig. 1 of the coupling element connected to the driven shaft; Fig. 3 represents a section, on the line 3—3 of Fig. 1 of the coupling element connected with the driving element; Fig. 4 represents a side view of the main portion of the disengaging device; and Fig. 5 represents a perspective view of one of the disengaging pawls.

In Figs. 1 and 2, $a$ is a housing which is splined on the shaft $a_1$ to be driven. In Fig. 1, the cover is cut away so that only the cylindrical wall of the housing appears. The driving half of the coupling consists of a cylindrical readily revoluble part $b$ fitting into the housing, which part $b$ is mounted upon a plate $b_1$ closing the open end of the housing, a lever $d$ being connected to the part $b$. A link $e$ engages the lever $d$, said link being adapted to be coupled to an eccentric mounted upon a rotary shaft of the machine, or receiving in some other suitable manner a reciprocating motion. On the periphery of the cylindrical portion $b$ of the driving half of the coupling are provided a number of recesses $f$. In the case illustrated, for example, three such recesses are provided. The tangentially arranged surfaces of the recesses $f$ are somewhat inclined to the inner periphery of the housing $a$, and in each recess lies a clamping roll $c$, which is pressed by a spring $g$ toward the narrower end of the recess. The springs tend, therefore, in the well known way, to couple the driving and the driven parts together.

At their open ends the recesses $f$ merge into cylindrical bores $i$, which serve as journals for the pawls $h$. The springs $g$ press the rolls $c$ against the tails of the pawls $h$ and thereby tend to force the noses of the pawls inwardly. If, on the other hand, the noses of the pawls are pressed outwardly against the pressure of the springs $g$, their tails force the clamping rolls $c$ back into the rear part of the recesses $f$ and release the coupling.

The disengaging device, which is shown separate in Fig. 4, consists of a round disk $l_1$ in whose center is located a cylindrical nipple $l$. The nipple $l$ is loosely revoluble in a corresponding bore in the driving element $b$ of the coupling and surrounds the hub of the driven half $a$ of the coupling. At the upper end of the nipple three pawls $h$ corresponding to the three recesses $k$ are provided, into which the noses of the pawls engage. In the direction of the driving stroke the recesses $k$ end in the bearing surfaces $k_1$. The disk $l_1$ is provided with a lever $m$, which can be rotated through an angle corresponding to the length of the recesses $k$ on the periphery of the nipple $l$, and can be locked in the position of adjustment by inserting a pin in one of the adjusting holes $m_1$ of a sector or in any other desired manner.

The mode of operation of the device is as follows: If a reciprocating motion is imparted to the lever $d$ by means of the link $e$, and if we neglect for the moment the pawls $h$, then the rolls $c$ at each stroke which the lever $d$ makes in a counter clockwise direction, clamp themselves firmly between the tangentially directed surfaces of the recesses $f$ and the inner periphery of the housing $a$, and motion is imparted to the driven half of the coupling. At each stroke in a clockwise direction, the clamping rolls $c$ roll away from the tangential surfaces of $f$ and the driven half of the coupling remains stationary. In the rotation of the driving part $b$, however, the pawls $h$ are likewise carried along, and, when the disengaging device $l$ is so adjusted that the noses of the pawls during the stroke reach the surfaces $k_1$, then the pawls are diverted outwardly, their tails press the clamping rolls $c$ back against the springs $g$, and thus disengage the coupling. According to the adjustment of the disengaging device $l$ or of the lever $m$, therefore, the coupling is disengaged after a shorter or a longer working stroke, and if, for instance, it is used for driving a lubricating pump, the number of complete strokes of the pump are correspondingly diminished or increased in a given unit of time. By correspondingly adjusting the lever $m$, therefore, without changing the speed of rotation of the driving part, the speed of the driven part may be altered at will during the operation, between zero and its maximum.

What I claim is:—

1. A device for changing a constant oscillating movement to a variable rotary motion, comprising a driving element connected to the oscillating member and a driven element connected to a rotatory shaft, a roller clutch interposed between said elements and effective to connect them in a single direction of oscillation, pawls pivoted on the roller-carrying member and having tails projecting into contact with the rollers, and adjustable abutments in the path of movement of the noses of the pawls, whereby after a predetermined length of stroke in the clutching direction the pawls are turned on their pivots to force the rollers out of clutching position.

2. A device for changing a constant oscillating movement to a variable rotary motion, comprising a driving element connected to the oscillating member and a driven element connected to a rotatory shaft, a roller clutch interposed between said members and effective to connect them in a single direction of oscillation, pawls pivoted on the roller-carrying member and having tails projecting into contact with the rollers, and an adjustable lever arm carrying abutments in the path of movement of the noses of the pawls, whereby after a predetermined length of stroke in the clutching direction the pawls are turned on their pivots to force the rollers out of clutching position.

In testimony whereof I affix my signature, in presence of two witnesses.

EUGEN WOERNER.

Witnesses:
MAX ANSCHÜTZ,
REINHOLD ELWERT.